United States Patent
Varvarezis et al.

(10) Patent No.: US 11,652,640 B2
(45) Date of Patent: *May 16, 2023

(54) SYSTEMS AND METHODS FOR OUT-OF-BAND AUTHENTICITY VERIFICATION OF MOBILE APPLICATIONS

(71) Applicant: Capital One Services, LLC, McLean, VA (US)

(72) Inventors: Panayiotis Varvarezis, Wilmington, DE (US); Mausam Gautam, Fairfax, VA (US); Reza Jaberi, Herndon, VA (US); Edward Lee, Los Angeles, CA (US); Chad Landis, Severna Park, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/205,107

(22) Filed: Mar. 18, 2021

(65) Prior Publication Data

US 2021/0211293 A1 Jul. 8, 2021

Related U.S. Application Data

(63) Continuation of application No. 16/674,112, filed on Nov. 5, 2019, now Pat. No. 10,985,921.

(51) Int. Cl.
*H04L 29/06* (2006.01)
*H04L 9/32* (2006.01)
(Continued)

(52) U.S. Cl.
CPC .......... *H04L 9/3234* (2013.01); *H04L 9/0822* (2013.01); *H04L 9/3215* (2013.01); *H04W 4/20* (2013.01); *H04W 12/06* (2013.01); *H04W 12/08* (2013.01); *H04W 12/35* (2021.01); *H04L 2209/80* (2013.01)

(58) Field of Classification Search
None
See application file for complete search history.

(56) References Cited

U.S. PATENT DOCUMENTS 3,910,295 A 10/1975 Fletcher
6,681,017 B1 1/2004 Matias et al.
(Continued)

*Primary Examiner* — Maung T Lwin
(74) *Attorney, Agent, or Firm* — Hunton Andrews Kurth LLP

(57) ABSTRACT

Example embodiments of systems and methods for application verification are provided. An application may generate a cryptographic key, and encrypt the cryptographic key with a predefined public key. A server, in data communication with the application, may include a predefined private key. The application may transmit the cryptographic key to the server. The server may receive, from the application, the cryptographic key; decrypt the cryptographic key using the predefined private key; encrypt an authorization token using the decrypted key; and transmit, to the client application, the authorization token via an out-of-band channel. The application may receive, from the server, the authorization token via the out-of-band channel; and decrypt the authorization token to obtain access to one or more services associated with the server.

20 Claims, 4 Drawing Sheets

(51) Int. Cl.
    *H04L 9/08*     (2006.01)
    *H04W 12/06*     (2021.01)
    *H04W 12/08*     (2021.01)
    *H04W 4/20*     (2018.01)
    *H04W 12/30*     (2021.01)

(56) References Cited

U.S. PATENT DOCUMENTS

| | | |
|---|---|---|
| 7,181,620 B1 | 2/2007 | Hur |
| 7,340,600 B1 | 3/2008 | Corella |
| 7,571,311 B2 | 8/2009 | Ilac et al. |
| 8,024,488 B2 | 9/2011 | Salowey et al. |
| 8,065,720 B1 | 11/2011 | Ebrahimi et al. |
| 8,379,850 B1 * | 2/2013 | Bridgford ............. H04L 9/0822 380/37 |
| 8,392,980 B1 | 3/2013 | Ahrens et al. |
| 8,667,269 B2 | 3/2014 | Schibuk |
| 8,799,649 B2 | 8/2014 | Eyal et al. |
| 9,026,782 B2 * | 5/2015 | Ahuja ................. H04L 9/3213 713/150 |
| 9,059,853 B1 | 6/2015 | Bortz et al. |
| 9,537,857 B1 | 1/2017 | Koved et al. |
| 9,544,137 B1 | 1/2017 | Brandwine |
| 9,774,632 B2 | 9/2017 | Gallant et al. |
| 9,819,496 B2 | 11/2017 | Lin et al. |
| 10,356,057 B2 | 7/2019 | John et al. |
| 2002/0116509 A1 * | 8/2002 | DeLaHuerga ........ A61J 7/0084 713/176 |
| 2004/0268152 A1 | 12/2004 | Xia et al. |
| 2005/0108575 A1 | 5/2005 | Yung |
| 2005/0210247 A1 | 9/2005 | Ong et al. |
| 2006/0005032 A1 | 1/2006 | Cain et al. |
| 2007/0256123 A1 | 11/2007 | Duane et al. |
| 2009/0240936 A1 | 9/2009 | Lambiase et al. |
| 2009/0307486 A1 | 12/2009 | Grajek et al. |
| 2009/0313705 A1 * | 12/2009 | Adams ................. H04L 9/0822 726/30 |
| 2010/0217975 A1 | 8/2010 | Grajek et al. |
| 2011/0179478 A1 | 7/2011 | Flick |
| 2012/0072718 A1 | 3/2012 | Ronda et al. |
| 2012/0297206 A1 * | 11/2012 | Nord .................... H04L 9/14 713/193 |
| 2013/0268766 A1 | 10/2013 | Schrecker |
| 2013/0268767 A1 | 10/2013 | Schrecker |
| 2014/0058951 A1 | 2/2014 | Kuppuswamy |
| 2014/0068244 A1 * | 3/2014 | Oliver .................. H04L 9/00 713/150 |
| 2014/0068251 A1 | 3/2014 | Ignaci et al. |
| 2014/0331060 A1 | 11/2014 | Hayton |
| 2014/0380453 A1 | 12/2014 | Alonso Cebrian et al. |
| 2015/0350168 A1 | 12/2015 | Hayton |
| 2016/0037337 A1 * | 2/2016 | Elliott .................. H04L 63/105 713/168 |
| 2016/0164680 A1 | 6/2016 | Liao et al. |
| 2016/0255056 A1 * | 9/2016 | Shalunov ............ H04L 63/0428 713/168 |
| 2016/0255080 A1 | 9/2016 | Griffin et al. |
| 2016/0337321 A1 | 11/2016 | Lin et al. |
| 2017/0201528 A1 | 7/2017 | Kim et al. |
| 2017/0289197 A1 | 10/2017 | Mandyam et al. |
| 2017/0346807 A1 | 11/2017 | Blasi |
| 2018/0026973 A1 | 1/2018 | Le Saint et al. |
| 2018/0316494 A1 * | 11/2018 | Kurian .................... H04L 9/12 |
| 2018/0367307 A1 | 12/2018 | Ekberg |
| 2019/0305949 A1 | 10/2019 | Hamel et al. |
| 2020/0252388 A1 | 8/2020 | Tran et al. |
| 2020/0274868 A1 * | 8/2020 | Passaglia ................ G06F 21/33 |

\* cited by examiner

200

SYSTEMS AND METHODS FOR OUT-OF-BAND AUTHENTICITY VERIFICATION OF MOBILE APPLICATIONS

CROSS REFERENCE TO RELATED APPLICATION

The subject application is a Continuation of Ser. No. 16/674,112 filed Nov. 5, 2019, the complete disclosure of which is incorporated herein by reference in its entirety.

FIELD OF THE INVENTION

The present disclosure relates to verification, and more particularly, to systems and methods for out-of-band authenticity verification of mobile applications.

BACKGROUND

Data security and transaction integrity are of critical importance to businesses and consumers. This need continues to grow as electronic transactions constitute an increasingly large share of commercial activity. Challenge-response mechanisms may be used as a tool to verify transactions, but present deficiencies and are susceptible to attack in that malicious actors may intercept challenge-response mechanisms, and imitate, implement, or reverse engineer response logic, thereby defeating the purpose of challenge-response mechanisms and reducing reliability in security.

These and other deficiencies exist. Accordingly, there is a need to provide users with an appropriate solution that overcomes these deficiencies to provide data security, authentication, and verification for mobile applications.

SUMMARY

Aspects of the disclosed technology include systems and methods for out-of-band authenticity verification of mobile applications.

Embodiments of the present disclosure provide an application verification system, comprising: a client application comprising instructions for execution on a client device including one or more processors coupled to memory, the client application being configured to generate a cryptographic key, and encrypt the cryptographic key with a predefined public key. The system may include one or more servers in data communication with the client application, the one or more servers may comprise a predefined private key. The client application may be configured to transmit the cryptographic key to the one or more servers. The one or more servers may be configured to: receive, from the client application, the cryptographic key; decrypt the cryptographic key using the predefined private key; encrypt an authorization token using the decrypted key; and transmit, to the client application, the authorization token via an out-of-band channel. The client application may be configured to: receive, from the one or more servers, the authorization token via the out-of-band channel; and decrypt the authorization token to obtain access to one or more services associated with the one or more servers.

Embodiments of the present disclosure provide a method for authenticating an application, comprising: generating, by an application comprising instructions for execution on a client device, a cryptographic key; encrypting, by the application, the cryptographic key via a public key; transmitting, by the application, the encrypted cryptographic key to at least one server; receiving, by the at least one server, the encrypted cryptographic key; decrypting, by the at least one server, the encrypted cryptographic key; encrypting, by the at least one server, an authorization token using the decrypted cryptographic key; transmitting, to the application, the encrypted authorization token via an out-of-band channel; receiving, by the application, the encrypted authorization token via the out-of-band channel; decrypting, by the application, the encrypted authorization token; and receiving, at the application, access or permission to one or more resources associated with the at least one server based on the decrypted authorization token.

Embodiments of the present disclosure provide a computer readable non-transitory medium comprising computer-executable instructions that are executed on a processor and comprising the steps of: requesting an authorization token from at least one server via a first channel; generating a cryptographic key; encrypting the cryptographic key via a public key; transmitting the encrypted cryptographic key to the at least one server; receiving the encrypted cryptographic key; decrypting the encrypted cryptographic key; transmitting one or more status codes, the one or more status codes associated with decryption status of the cryptographic key, wherein at least one status code includes a notification of a successful decryption of the cryptographic key; encrypting the authorization token using the decrypted cryptographic key; transmitting the encrypted authorization token via a second channel, the second channel comprising an out-of-band channel; receiving the encrypted authorization token via the out-of-band channel; decrypting the encrypted authorization token; and receiving access to one or more services associated with the at least one server based on the decrypted authorization token.

Further features of the disclosed design, and the advantages offered thereby, are explained in greater detail hereinafter with reference to specific example embodiments illustrated in the accompanying drawings, wherein like elements are indicated be like reference designators.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

When an application, such as an application comprising instructions for execution on a client device, attempts to connect to and use server resources, there is a need to ensure that the application is not from a malicious third party but rather an approved implementation that is authorized to access the server resources.

Figure 1:
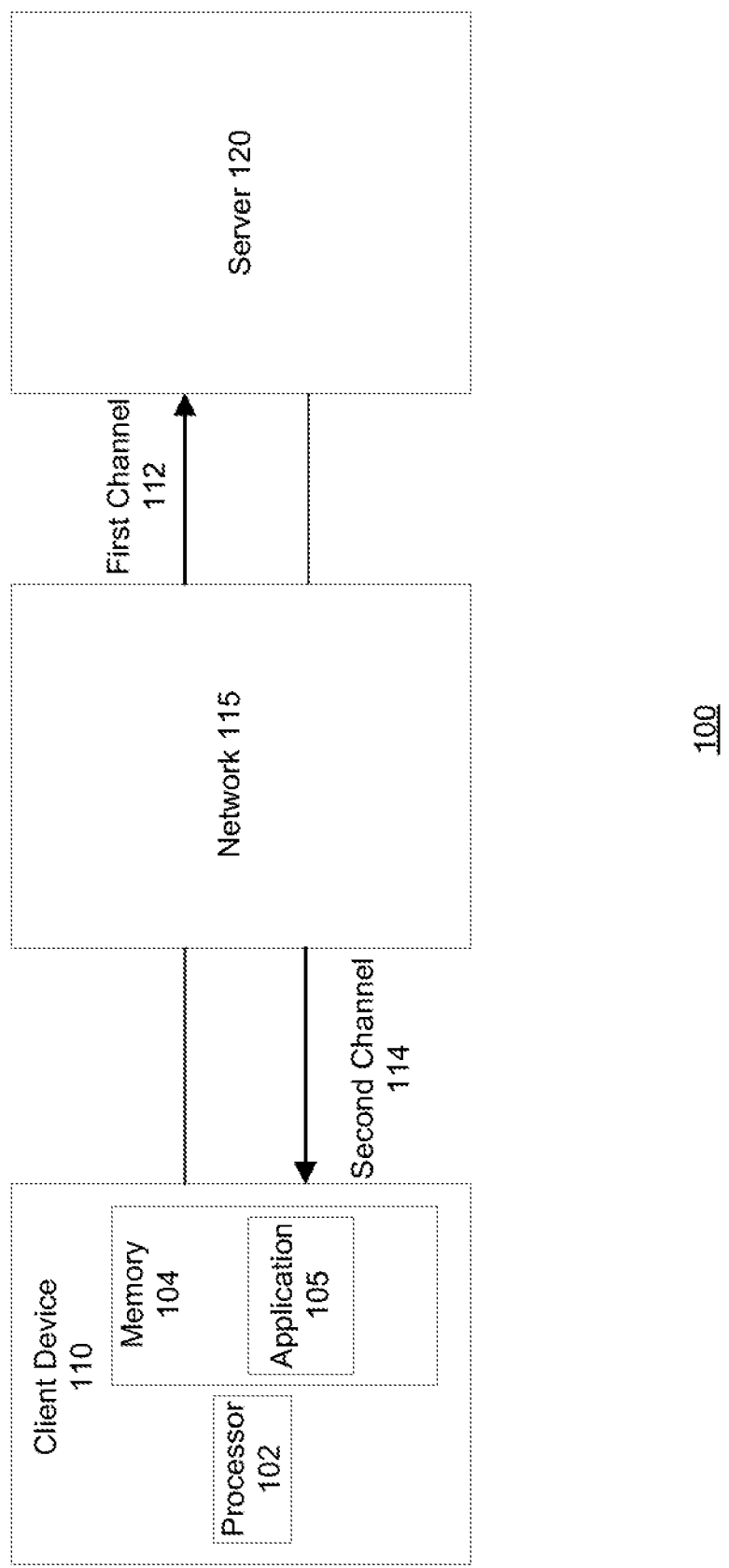
FIG. 1 is a diagram of an application verification system according to an example embodiment.

FIG. 1 illustrates an application verification system according to an example embodiment. As further discussed below, system 100 may include application 105 comprising instructions for execution on client device 110, network 115, and server 120. Although FIG. 1 illustrates single instances of the components, system 100 may include any number of components.

System 100 may include client device 110, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 110 can include a processor 102 and a memory 104, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications 105, such as software applications, in memory 104 that enable, for example, network communications with one or more components of system 100 and transmit and/or receive data.

Application 105 may be in communication with one or more servers 120 via one or more networks 115, and may operate as a respective front-end to back-end pair with server 120. Application 105, for example a mobile device application executing on client device 110, may be configured to transmit one or more requests to server 120. The one or more requests may be associated with retrieving data from server 120. Server 120 may receive the one or more requests from application 105. For example, the server 120 may be configured to receive one or more requests from the application 105 in order to provide access to one or more services. Based on the one or more requests from application 105, server 120 may be configured to retrieve the requested data from within or accessible to server 120, or from one or more databases (not shown). Based on receipt of the requested data from the one or more databases, or within or accessible to server 120, server 120 may be configured to transmit the received data to application 105, the received data being responsive to one or more requests.

In some examples, application 105 may be configured to generate a key that is encrypted with a pre-defined, known, asymmetric public key known only to the server 120. Application 105 may be configured to connect to server 120, and transmit the encrypted cryptographic key. In some examples, the cryptographic key may comprise a symmetric key.

System 100 may include one or more networks 115. In some examples, network 115 may be one or more of a wireless network, a wired network or any combination of wireless network and wired network, and may be configured to connect application 105 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to one or more client applications 105 via one or more networks 115.

Server 120 may comprise one or more keys, such as one or more private keys. The private key may be predefined. Server 120 may be configured to receive the cryptographic key from application 105. Server 120 may be configured to decrypt the cryptographic key using the private key.

Server 120 may be configured to receive the encrypted cryptographic key from application 105. Server 120 may be configured to decrypt the encrypted cryptographic key. Server 120 may be configured to inform application 105 of a status of decryption process performed on the encrypted data using an associated pre-defined, known asymmetric private key. For example, server 120 may be configured to transmit, to the application 105, one or more status indicators associated with decryption of the cryptographic key. In some examples, a first status indicator may comprise a message indicative of successful decryption of the cryptographic key. In other examples, a second status indicator may comprise a message indicative of unsuccessful decryption of the cryptographic key. In some examples, server 120 may be configured to, responsive to the unsuccessful decryption of the cryptographic key, disconnect from the application 105. Thus, the decryption process may be successful or unsuccessful. For example, if the decryption process is successful, server 120 may be configured to transmit a successful status to application 105. In another example, if the decryption process is not successful, the server 120 may be configured to transmit an error status and disconnect the application, and no further action may be taken by the server 120. In some examples, the server 120 may be configured to, upon determining an unsuccessful decryption, attempt decryption up to and including a predetermined threshold number of times so as to yield a successful decryption and transmit an associated successful status to application 105.

Server 120 may use the cryptographic key, obtained through the decryption process, to encrypt a token, such as an authorization token. The authorization token may comprise a limited duration and/or single use token. In some examples, the client application 105 may transmit a request to server 120 via a first channel 112 to obtain the authorization token. For example, the first channel 112 may comprise an in-band channel. In some examples, the client application 105 may be configured to transmit the request the authorization token via an in-band channel that is independent of a second channel 114. By way of example, the in-band channel may use one or more protocols such as telnet or secure shell (SSH).

Server 120 may be configured to transmit the encrypted authorization token through the second channel 114 configured for direct-to-application communication, including but not limited to Google® Cloud Messaging, Firebase® Cloud Messaging, Apple® Push Notification Service. In some examples, the second channel 114 may comprise a previously negotiated, secure, out-of-band channel. Using the decrypted key, server 120 may be configured to encrypt an authorization token. Server 120 may be configured to transmit the authorization token to client application 105 via the out-of-band channel.

Application 105 may be configured to receive the token from server 120 via the out-of-band channel. In some examples, application 105 may be configured to decrypt the encrypted token using the generated cryptographic key. Upon successful decryption of the token, application 105 may now possess an authorization token which confirms that the application 105 has not been tampered with. Application 105 may be configured to decrypt the authorization token to obtain access to one or more services associated with the one or more servers 120.

Using the trusted, previously negotiated, secure, out-of-band channel configured to only communicate with an application 105 that is officially authorized prevents the ability for malicious applications to obtain an authorization token to continue access to the server and/or services associated with server 120. Thus, the systems and methods described herein would require the malicious actor to insert themselves into the secure channel between the server 120 and application 105, which in turn would invalidate the secure nature of the channel.

Figure 2:
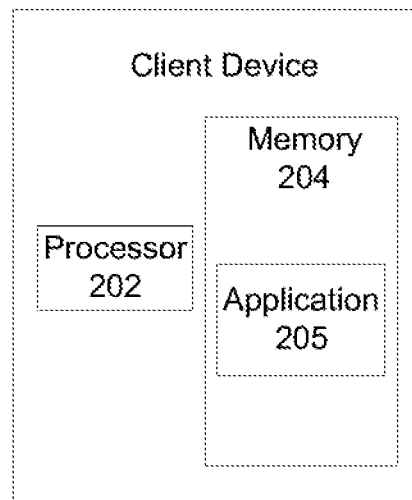
FIG. 2 is a diagram of a client device according to an example embodiment.

FIG. 2 illustrates diagram of a client device 200 according to an example embodiment. Client device 200 may reference same or similar components as client device 110 of FIG. 1. Client device 200 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 200 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Client device 200 may include a processor 202 and a memory 204, similar to that of processor 102 and memory 104, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 200 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touchscreen, microphone, digital camera, video recorder or camcorder. These devices may be used to enter information and interact with the software and other devices described herein.

In some examples, client device 200 may execute one or more applications 205, such as software applications similar to that of application 105, in memory 204 that enable, for example, network communications with one or more components of system, similar to that of system 100, and transmit and/or receive data.

Application 205 may be in communication with one or more servers, similar to that of server 120, via one or more networks, similar to that of network 115, and may operate as a respective front-end to back-end pair with the server. Application 205, for example a mobile device application executing on client device 200, may be configured to transmit one or more requests to server. The one or more requests may be associated with retrieving data from the server. The server may receive the one or more requests transmitted from application 205, and application 205 may be configured to receive requested data associated with the one or more requests transmitted to the server.

In some examples, application 205 may be configured to generate a key that is encrypted with a pre-defined, known, asymmetric public key known only to the server. Application 205 may be configured to connect to the server, and transmit the encrypted cryptographic key. In some examples, the cryptographic key may comprise a symmetric key.

Application 205 may be configured to receive a token from server via the out-of-band channel, as explained above with respect to FIG. 1. In some examples, application 205 may be configured to decrypt the encrypted token using the generated cryptographic key. Upon successful decryption of the token, application 205 may now possess an authorization token which confirms that the application 205 has not been tampered with. Application 205 may be configured to decrypt the authorization token to obtain access to one or more services associated with the one or more servers.

Figure 3:
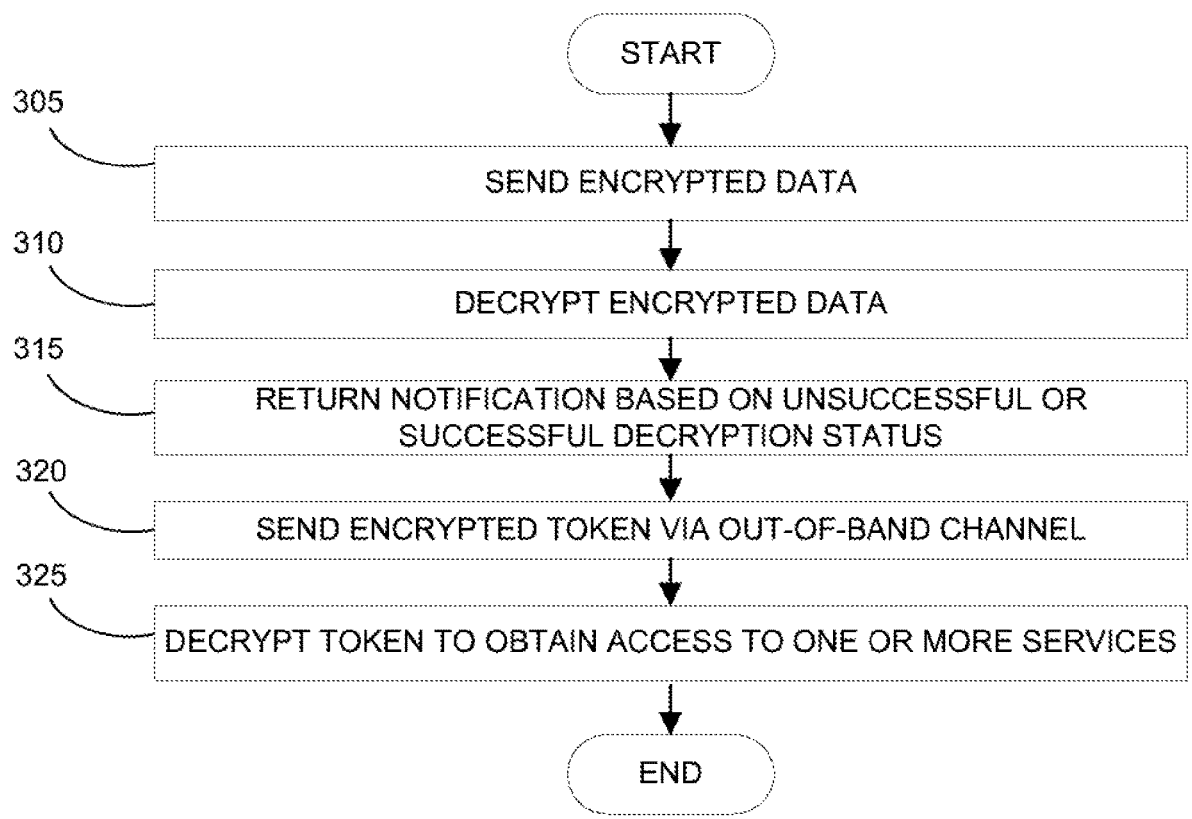
FIG. 3 is a method illustrating a sequence for authentication according to an example embodiment.

FIG. 3 illustrates a method 300 for authentication according to an example embodiment. In some examples, method 300 may reference same or similar components as illustrated in FIG. 1 and FIG. 2.

At block 305, method 300 may include sending, by an application comprising instructions for execution on a client device, encrypted data. For example, the encrypted data may include an encrypted cryptographic key. The encrypted data may be transmitted from the application to one or more servers. The data may be encrypted via a public key. In some examples, the application may be configured to generate a key that is encrypted with a pre-defined, known, asymmetric public key known only to the server. The application may be configured to connect to server, and transmit the encrypted data. In some examples, the cryptographic key may comprise a symmetric key. The at least one server may reference same or similar components as server 120 of FIG. 1, as described above. The server may include one or more processors, which are coupled to memory. The server may be configured as a central system, server or platform to control and call various data at different times to execute a plurality of workflow actions. The server may be configured to connect to the one or more databases. The server may be connected to one or more applications via one or more networks.

Client device may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device may execute one or more applications, such as software applications, that enable, for example, network communications with one or more components of system and transmit and/or receive data. The application may be in communication with one or more servers via one or more networks, same or similar to network 115 as described above with respect to FIG. 1, and may operate as a respective front-end to back-end pair with server. The application, for example a mobile device application executing on client device, may be configured to transmit one or more requests to the server. The one or more requests may be associated with retrieving data from the server.

The network may be one or more of a wireless network, a wired network or any combination of wireless network and wired network, and may be configured to connect application to the server. For example, the network may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network may include, without limitation, telephone lines, fiber optics, IEEE Ethernet 902.3, a wide area network, a wireless personal area network, a LAN, or a global network such as the Internet. In addition, the network may support an Internet network, a wireless communication network, a cellular network, or the like, or any combination thereof. The network may further include one network, or any number of the exemplary types of networks mentioned above, operating as a stand-alone network or in cooperation with each other. The network may utilize one or more protocols of one or more network elements to which they are communicatively coupled. The network may translate to or from other protocols to one or more protocols of network devices. Although the network is depicted as a single network, it should be appreciated that according to one or more examples, the network may comprise a plurality of interconnected networks, such as, for example, the Internet, a service provider's network, a cable television network, corporate networks, such as credit card association networks, and home networks.

At block 310, method 300 may include decrypting, by the at least one server, the encrypted data. The at least one server may be configured to receive the transmitted encrypted data from the application. For example, the at least one server may receive the encrypted cryptographic key. The server may comprise one or more keys, such as one or more private keys. The private key may be predefined. The server may be configured to receive the cryptographic key from the application. The server may be configured to decrypt the encrypted data using the private key.

At block 315, method 300 may include returning, by the at least one server, a notification based on unsuccessful or successful decryption status of the encrypted data. For example, the at least one server may be configured to transmit one or more status codes to the application, the one or more status codes associated with decryption of the cryptographic key. The server may be configured to notify application of a status of decryption process performed on the encrypted data using an associated pre-defined, known asymmetric private key. The one or more status codes or indicators may be associated with the decryption of the encrypted data. In some examples, at least one of the status codes may include a notification of a successful decryption of the encrypted data. In other examples, at least one of the status codes may include a notification of an unsuccessful decryption of the encrypted data. In some examples, the server may be configured to, upon determining an unsuccessful decryption, attempt decryption up to and including a predetermined threshold number of times so as to yield a successful decryption and transmit an associated successful status to the application. In some examples, the at least one server may be configured to disconnect from the application based on the unsuccessful decryption of the encrypted data.

At block 320, method 300 may include sending, by the at least one server, an encrypted token via a second channel, such as an out-of-band channel, based on a request transmitted from the application to the at least one server via a first channel. In some examples, the client application may transmit a request to the at least one server via a first channel to obtain the authorization token. For example, the first channel may comprise an in-band channel. In some examples, the client application may be configured to transmit the request the authorization token via an in-band channel that is independent of the second channel. By way of example, the in-band channel may use one or more protocols such as telnet or SSH.

For example, the at least one server may be configured to encrypt a token using the decrypted cryptographic key. In some examples, the token may comprise an authorization token. The server may use the cryptographic key, obtained through the decryption process, to encrypt the token. In some examples, the token may comprise a limited duration and/or single use token. In some examples, the second channel may comprise a previously negotiated, secure, out-of-band channel. The second channel may be configured for direct-to-application communication. The server may be configured to transmit the encrypted token through the channel configured for direct-to-application communication, including but not limited to Google® Cloud Messaging, Firebase® Cloud Messaging, Apple® Push Notification Service. The server may be configured to transmit the token to the application. The application may be configured to receive the encrypted token from the server via the out-of-band channel.

At block 325, method 300 may include decrypting, by the application, the token obtain access to one or more servers. For example, the application may be configured to receive the encrypted authorization token via the second channel. In some examples, the application may be configured to decrypt the encrypted token using the generated cryptographic key. Upon successful decryption of the token, the application may now possess an authorization token which confirms that the application has not been tampered with. The application may be configured to decrypt the authorization token to obtain access or permission to one or more services associated with the one or more servers.

Figure 4:
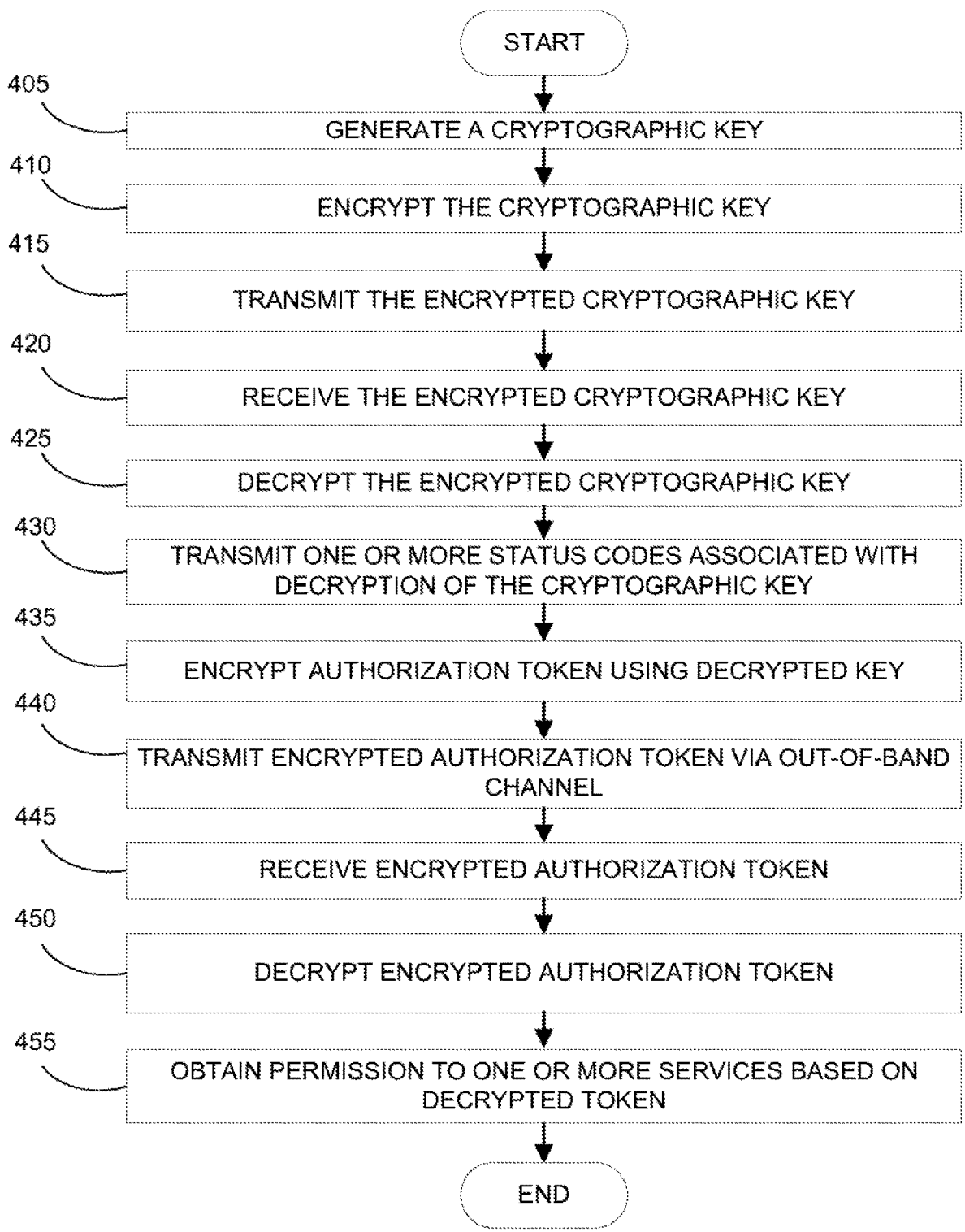
FIG. 4 is a method illustrating a sequence for authenticating an application according to an example embodiment.

FIG. 4 illustrates a method 400 for authenticating an application according to an example embodiment. At block 405, method 400 may include generating, by an application comprising instructions for execution on a client device, a cryptographic key. In some examples, the client device may reference same or similar components as client device 110 of FIG. 1, client device 200 of FIG. 2, and method 300 as described above.

Client device may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device may execute one or more applications, such as software applications, that enable, for example, network communications with one or more components of system and transmit and/or receive data. The application may be in communication with one or more servers via one or more networks, same or similar to network 115 as described above with respect to FIG. 1, and may operate as a respective front-end to back-end pair with server. The application, for example a mobile device application executing on client device, may be configured to transmit one or more requests to the server. The one or more requests may be associated with retrieving data from the server.

The network may be one or more of a wireless network, a wired network or any combination of wireless network and wired network, and may be configured to connect application to the server. For example, the network may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network may include, without limitation, telephone lines, fiber optics, IEEE Ethernet 902.3, a wide area network, a wireless personal area network, a LAN, or a global network such as the Internet. In addition, the network may support an Internet network, a wireless communication network, a cellular network, or the like, or any combination thereof. The network may further include one network, or any number of the exemplary types of networks mentioned above, operating as a stand-alone network or in cooperation with each other. The network may utilize one or more protocols of one or more network elements to which they are communicatively coupled. The network may translate to or from other protocols to one or more protocols of network devices. Although the network is depicted as a single network, it should be appreciated that according to one or more examples, the network may comprise a plurality of interconnected networks, such as, for example, the Internet, a service provider's network, a cable television network, corporate networks, such as credit card association networks, and home networks.

At block 410, method 400 may include encrypting, by the application, the cryptographic key via a public key. In some examples, the application may be configured to generate a key that is encrypted with a pre-defined, known, asymmetric public key known only to the server. The application may be configured to connect to server, and transmit the encrypted cryptographic key. In some examples, the cryptographic key may comprise a symmetric key.

At block 415, method 400 may include transmitting, by the application, the encrypted cryptographic key to at least one server. The at least one server may reference same or similar components as server 120 of FIG. 1, as described above. The server may include one or more processors, which are coupled to memory. The server may be configured as a central system, server or platform to control and call various data at different times to execute a plurality of workflow actions. The server may be configured to connect to the one or more databases. The server may be connected to one or more applications via one or more networks.

The server may be configured to receive one or more requests from the application in order to provide access to one or more services. Based on the one or more requests from application, the server may be configured to retrieve the requested data from within or accessible to the server, or from one or more databases (not shown). Based on receipt of the requested data from the one or more databases, or within or accessible to the server, the server may be configured to transmit the received data to application, the received data being responsive to one or more requests.

At block 420, method 400 may include receiving, by the at least one server, the encrypted cryptographic key. The server may comprise one or more keys, such as one or more private keys. The private key may be predefined. The server may be configured to receive the cryptographic key from the application.

At block 425, method 400 may include decrypting, by the at least one server, the encrypted cryptographic key. The server may be configured to decrypt the cryptographic key using the private key.

At block 430, method 400 may include transmitting, by the at least one server, one or more status codes to the application, the one or more status codes associated with decryption of the cryptographic key. For example, the server may be configured to inform application of a status of decryption process performed on the encrypted data using an associated pre-defined, known asymmetric private key. The one or more status codes or indicators may be associated with the decryption of the cryptographic key. In some examples, at least one of the status codes may include a notification of a successful decryption of the cryptographic key. In other examples, at least one of the status codes may include a notification of an unsuccessful decryption of the cryptographic key. In some examples, the server may be configured to, upon determining an unsuccessful decryption, attempt decryption up to and including a predetermined threshold number of times so as to yield a successful decryption and transmit an associated successful status to the application. In some examples, the method 400 may further include disconnecting, by the at least one server, from the application based on the unsuccessful decryption of the cryptographic key, as explained above.

At block 435, method 400 may include encrypting, by the at least one server, an authorization token using the decrypted cryptographic key. For example, the server may use the cryptographic key, obtained through the decryption process, to encrypt a token, such as an authorization token. The authorization token may comprise a limited duration and/or single use token. For example, using the decrypted key, the server may be configured to encrypt an authorization token.

At block 440, method 400 may include transmitting, to the application, the encrypted authorization token via a second channel, such as an out-of-band channel, based on a request transmitted via a first channel. In some examples, the client application may transmit a request to the server via a first channel to obtain the authorization token. For example, the first channel may comprise an in-band channel. In some examples, the client application may be configured to transmit the request the authorization token via an in-band channel that is independent of the second channel. By way of example, the in-band channel may use one or more protocols such as telnet or SSH.

In some examples, the second channel may comprise a previously negotiated, secure, out-of-band channel. The second channel may be configured for direct-to-application communication. The server may be configured to transmit the encrypted authorization token through the channel configured for direct-to-application communication, including but not limited to Google® Cloud Messaging, Firebase® Cloud Messaging, Apple® Push Notification Service. The server may be configured to transmit the token to the application.

At block 445, method 400 may include receiving, by the application, the encrypted authorization token via the out-of-band channel. The application may be configured to receive the token from server via the out-of-band channel At block 450, method 400 may include decrypting, by the application, the encrypted authorization token. In some examples, the application may be configured to decrypt the encrypted token using the generated cryptographic key. Upon successful decryption of the token, the application may now possess an authorization token which confirms that the application has not been tampered with. The application may be configured to decrypt the authorization token to obtain access or permission to one or more services associated with the one or more servers.

At block 455, method 400 may include receiving, at the application, access or permission to one or more resources associated with the at least one server based on the decrypted authorization token.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An authentication server, comprising:
a memory storing a plurality of stored keys; and
a processor, wherein the processor:
   receives a first request for a first token, the first request including an encrypted first key,
   attempts decryption of the encrypted first key using a first stored key of the plurality of stored keys,
   responsive to an unsuccessful decryption of the encrypted first key, attempts further decryptions of the encrypted first key using one or more additional stored keys from the plurality of stored keys until a successful decryption of the encrypted first key,
   upon a successful decryption of the encrypted first key, encrypt the first token using the decrypted first key,
   transmits the encrypted first token, and
   authorizes, based on the successful decryption of the encrypted first token, permission to one or more services.

2. The authentication server of claim 1, wherein the processor receives the first request via a first channel.

3. The authentication server of claim 1, wherein the processor transmits the encrypted first token via a second channel.

4. The authentication server of claim 1, wherein the processor attempts decryption of the encrypted first key up to a predetermined number of attempts.

5. The authentication server of claim 1, wherein the first token comprises a limited use token.

6. The authentication server of claim 1, wherein the processor transmits, responsive to a status of decryption of the encrypted first key, one or more codes.

7. The authentication server of claim 6, wherein at least one code includes a notification of a successful decryption of the encrypted first key.

8. The authentication server of claim 6, wherein at least one code includes a notification of an unsuccessful decryption of the encrypted first key.

9. A method of authentication, comprising:
receiving, by a processor, a first request for a first token, the first request including an encrypted first key;
attempting, by the processor, decryption of the encrypted first key using a first stored key of a plurality of stored keys;
responsive to an unsuccessful decryption of the encrypted first key, attempting, by the processor, further decryptions of the encrypted first key using one or more additional stored keys from the plurality of stored keys until a successful decryption of the encrypted first key;
upon a successful decryption of the encrypted first key, encrypting the first token using the decrypted first key;
transmitting, by the processor, the encrypted first token; and
authorizing, by the processor, permission to one or more services based on the successful decryption of the encrypted first token.

10. The method of claim 9, further comprising receiving, by the processor, the first request via a first channel.

11. The method of claim 9, further comprising transmitting, by the processor, the encrypted first token via a second channel.

12. The method of claim 9, further comprising attempting, by the processor, decryption of the encrypted first key up to a predetermined number of attempts.

13. The method of claim 12, further comprising, disconnecting, by the processor, data communications after exhaustion of the predetermined number of attempts.

14. The method of claim 9, wherein the first token comprises a limited use token.

15. The method of claim 9, further comprising transmitting, by the processor and responsive to a status of decryption of the encrypted first key, one or more codes.

16. The method of claim 15, wherein at least one code includes a notification of a successful decryption of the encrypted first key.

17. The method of claim 15, wherein at least one code includes a notification of an unsuccessful decryption of the encrypted first key.

18. A computer readable non-transitory medium comprising computer-executable instructions that are executed on one or more processors and cause the one or more processors or perform procedures comprising:

receiving a first request for a first token, the first request including an encrypted first key;

attempting decryption of the encrypted first key using a first stored key of a plurality of stored keys;

responsive to an unsuccessful decryption of the first encrypted key, attempting further decryptions of the first encrypted key using one or more additional stored keys from the plurality of stored keys until a successful decryption of the first encrypted key;

upon a successful decryption of the encrypted first key, encrypting the first token using the decrypted first key;

transmitting, the encrypted first token; and authorizing, based on the successful decryption of the encrypted first token, permission to one or more services.

19. The computer readable non-transitory medium of claim 18, wherein the plurality of stored keys comprise one or more asymmetric private keys.

20. The computer readable non-transitory medium of claim 18, the procedures further comprising:

attempting decryption of the encrypted first key up to a predetermined number of attempts; and ending communication with an application upon reaching the predetermined number of attempts.

* * * * *